United States Patent [19]

Bergstein

[11] Patent Number: 4,960,363
[45] Date of Patent: Oct. 2, 1990

[54] FLUID FLOW DRIVEN ENGINE

[76] Inventor: Frank D. Bergstein, 11464 Lippelman Rd., Suite 200, Cincinnati, Ohio 45246

[21] Appl. No.: 397,519

[22] Filed: Aug. 23, 1989

[51] Int. Cl.$^5$ ................................................. F03D 7/00
[52] U.S. Cl. ...................................... 415/3.1; 415/4.4; 290/53; 290/54
[58] Field of Search ................... 415/4.2, 4.4, 7, 906, 415/907, 911, 149.1, 2 R, 3 R, 4 R, 3.1, 905, 2.1, 4.1, 8, 60; 416/122 A, 6; 290/54, 53, 43, 42

[56] References Cited

U.S. PATENT DOCUMENTS

| | | | |
|---|---|---|---|
| 326,718 | 9/1885 | Collins | 415/906 |
| 958,467 | 5/1910 | Bennett | 416/122 A X |
| 974,221 | 11/1910 | Wilber | 415/7 |
| 1,023,378 | 4/1912 | Hay | 415/7 |
| 1,109,839 | 9/1914 | Henry | 415/7 |
| 1,350,265 | 8/1920 | Recuero | 415/149.1 X |
| 3,807,890 | 4/1974 | Wright | 417/334 X |
| 3,928,771 | 12/1975 | Straumsnes | 290/43 |
| 3,986,786 | 10/1976 | Sellman | 415/4.4 X |
| 4,075,545 | 2/1978 | Haberer | 320/61 |
| 4,088,419 | 5/1978 | Hope et al. | 415/4.4 |
| 4,174,923 | 11/1979 | Williamson | 415/211.1 |
| 4,203,702 | 5/1980 | Williamson | 415/60 |
| 4,276,481 | 6/1981 | Parker | 415/7 X |
| 4,606,697 | 8/1986 | Appel | 416/122 A |

FOREIGN PATENT DOCUMENTS

| | | | |
|---|---|---|---|
| 2451751 | 5/1976 | Fed. Rep. of Germany | 415/2 R |
| 2539058 | 3/1977 | Fed. Rep. of Germany | 415/3 R |
| 3403657 | 8/1985 | Fed. Rep. of Germany | 415/2 R |
| 900038 | 6/1945 | France | 416/122 A |
| 2509384 | 1/1983 | France | 415/2 A |
| 1373858 | 2/1988 | U.S.S.R. | 415/4 R |
| 721926 | 1/1955 | United Kingdom | 415/3 R |
| 2041458 | 9/1980 | United Kingdom | 415/2 R |

*Primary Examiner*—John T. Kwon
*Attorney, Agent, or Firm*—Frost & Jacobs

[57] ABSTRACT

A fluid flow driven engine comprising two counter-directionally rotating rotors rotatably mounted on a base which can be used to secure the fluid flow driven engine in the path of a flowing fluid, the rotors comprising cylindrical drums with a plurality of circumferentially spaced impellers projecting radially outward from each drum, the rotors being placed in closely spaced relation so as to define a fluid flow passageway between the drums. A housing having a venturi shaped or tapered inlet and outlet surrounds the rotors so that the inlet and outlet direct a flowing fluid through the passageway and the venturi shape increases the velocity of a fluid entering the passageway, extension plates being slidably mounted in the inlet and outlet portions of the housing to vary the cross-sectional areas of the inlet and outlet, thereby varying the velocity of a flowing fluid entering the passageway. The rotors are capable of rotating in either direction so that the direction of fluid flow through the engine may be reversed.

3 Claims, 2 Drawing Sheets

FLUID FLOW DRIVEN ENGINE

The present invention relates to fluid flow driven engines and in particular a fluid flow driven engine having two contradirectional rotating rotors maintained in a housing having an inlet for directing a flowing fluid between the rotors wherein the size of the inlet can be varied to vary the velocity of the fluid past the rotors.

BACKGROUND OF THE INVENTION

The increasing energy demands of industrialized and developing nations combined with the increased concern for environmental effects of fossil fuel use have placed a greater emphasis and need on developing clean and efficient alternative energy sources. If properly harnessed, the tidal flows of oceans and rivers, as well as the force of the wind, can efficiently generate vast amounts of clean energy.

The prior art discloses many devices for harnessing the energy of flowing fluids, such as the current in a river or stream, the tidal flow of an ocean, or simply the force of the wind. For example, Williamson U.S. Pat. No. 4,203,702 discloses a water driven engine wherein a diverter diverts the flow of water onto the outer blades of two counter-rotating turbines mounted in side-by-side relation, thereby producing contradirectional rotation of the turbines to generate power. Williamson U.S. Pat. No. 4,174,923 shows a similar wind driven engine. Straumsnes U.S. Pat. No. 3,928,771, discloses a water driven engine wherein flowing water is directed by a venturi shaped inlet in the engine housing through a passageway formed between two counter-rotating turbines. Haberer U.S. Pat. No. 4,075,545 similarly discloses a wind driven engine for charging a car battery which incorporates a venturi shaped inlet to force air through the passageway maintained between two counter-rotating rotors.

The venturi shaped inlets, as shown in the prior art, are used to concentrate and increase the velocity of fluid flow between the rotors, thereby increasing the fluid flow engine power and efficiency. In many applications it would be desirable to be able to vary the fluid velocity to vary the engine power based on power demands. Although the prior art discloses means for increasing fluid flow engine power, means for varying the engine power by varying the fluid velocity are not disclosed.

SUMMARY OF THE INVENTION

The present invention relates to a fluid flow driven engine which can be placed in the path of a flowing fluid. The fluid flow driven engine generally comprises two counterdirectionlly rotating turbines or rotors rotatably mounted on a base and surrounded by a housing. The rotors generally comprise cylindrical drums having a plurality of circumferentially spaced impellers projecting radially outward from each drum. The rotors are placed in closely spaced relation so as to define a fluid flow passageway between the rotor drums. A fluid passing through the passageway strikes the impellers causing the rotors to rotate. The rotors are mechanically connected to each other and to an energy generating system. The housing includes two tapered or venturi shaped openings aligned with the passageway formed between the rotors. The venturi shaped openings operate to direct the flowing fluid to the passageway between the rotors and to increase the velocity of a fluid entering the passageway. Extension plates slidably mounted on opposing sides of the openings may be extended beyond the edges of each opening to vary the cross-sectional areas of the openings, thereby permitting the velocity of a flowing fluid entering the passageway to be varied to best suit operating conditions. The fluid flow engine is designed so that the direction of fluid flow through the engine is reversible, allowing the fluid flow engine to use the tidal flow of oceans and seas to generate power.

It is thus an object of this invention to provide a fluid flow driven engine wherein the engine power and efficiency may be controlled by controlling the velocity of a fluid flowing through the engine. It is another object of this invention to provide a fluid driven engine with enhanced performance characteristics. It is a further object to provide an engine that may be used to generate energy in flowing bodies of water where the flow direction reverses periodically.

DETAILED DESCRIPTION

Figure 1:
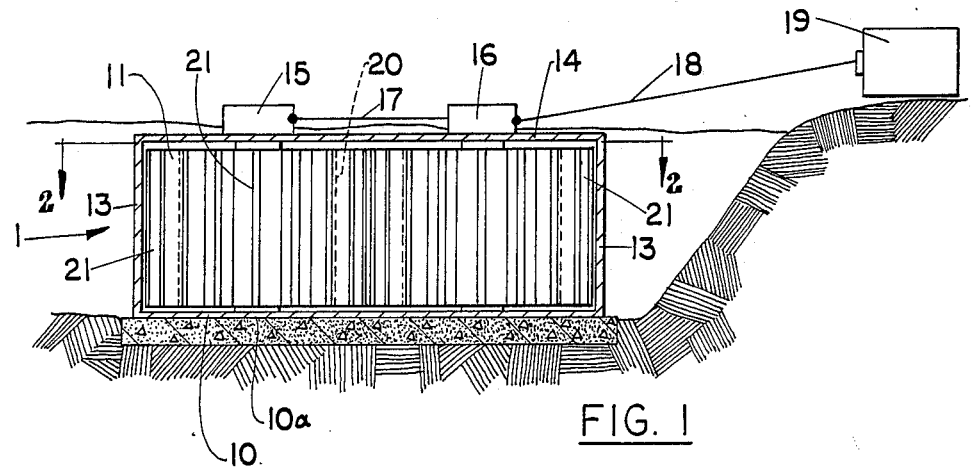
FIG. 1 is a front elevational view with parts broken away of a fluid flow driven engine of the present invention secured to the bed of a flowing body of water.
Figure 2:
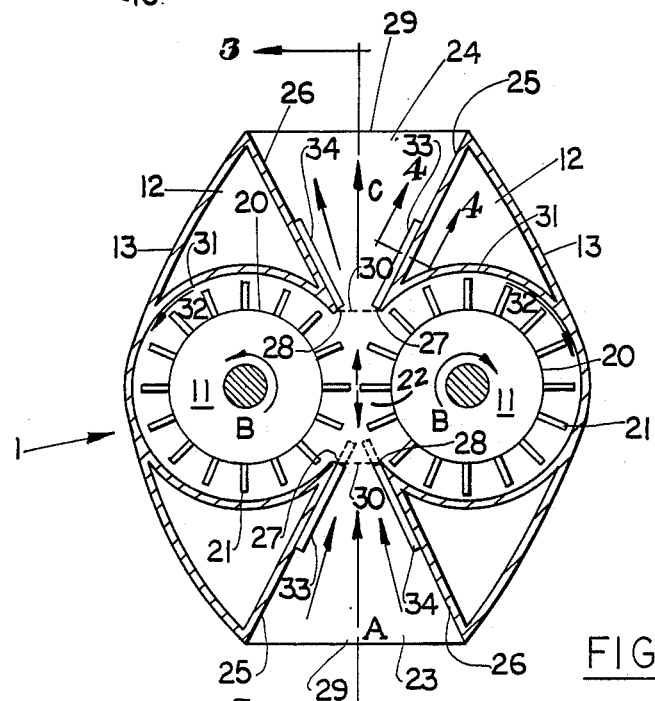
FIG. 2 is a sectional view taken along the line 2—2 in FIG. 1 of the fluid flow driven engine showing extension plates slidably mounted on the housing of the fluid flow driven engine.
Figure 3:
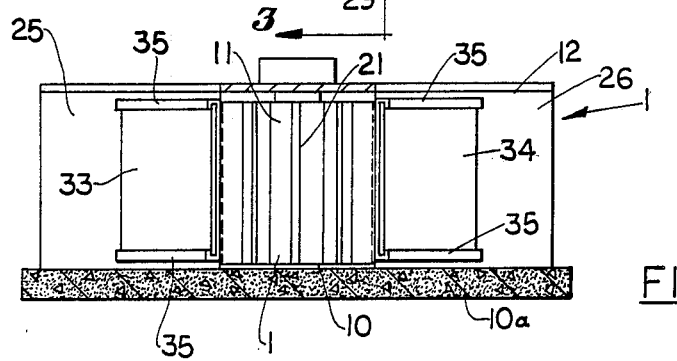
FIG. 3 is a sectional view taken along line 3—3 of FIG. 2.

Referring first to FIGS. 1-3 of the drawings, the reference numeral 1 generally represents a fluid flow driven engine of the present invention. The fluid flow driven engine 1 generally comprises a base 10, a pair of vertical rotors or turbines 11 rotatably mounted on the base 10 and a housing 12 which surrounds the rotors 11, as shown in FIG. 2. The housing 12 has an outer periphery 13 and a top 14. The rotors 11 are rotatably mounted to the base 10 as well as the top 14 in a manner to be described hereinafter.

The base 10 may be secured to the bottom of a flowing body of water or in the path of any flowing fluid, as by means of the foundation 10a. The rotors 11 are mechanically connected at their upper ends to reversible gear units 15 and 16 which, in the embodiment illustrated, are interconnected by coupling 17, and are further connected by a shaft 18 to a generator 19, as shown schematically in FIG. 1. Alternatively, each rotor may be operatively connected to a separate generator. The reversible gear units 15 and 16, the coupling 17, the shaft 18 and the generator 19 comprise known mechanical components which operate to transfer the rotational energy of the rotors 11 to one or more generators 19 when the rotors 11 rotate in either direction.

Referring now to FIG. 2, the rotors 11 each comprises a cylindrical drum 20 with a plurality of circumferentially spaced impellers or drive blades 21 projecting radially outward from each of the drum 20. The rotors 11 are placed in closely spaced relation so as to define a fluid flow passageway 22 between the drums 20 of rotors 11. A fluid passing through the passageway 22 in either direction will strike the impellers 21 causing the rotors 11 to rotate.

The outer periphery 13 of the housing is configured to define an inlet or first tapered passage 23 and an outlet or second tapered passage 24, as shown in FIG. 2. Each of the tapered passages 23 and 24 is formed by a pair of angularly related opposing wall surfaces 25 and 26 extending inwardly from the outer periphery 13 of the housing 12 toward the passageway 22. Each of the wall surfaces 25 and 26 terminates inwardly at edges 27 and 28, respectively, defining entrances to the passageway 22. In addition, each tapered passage 23 and 24 has an outer cross-sectional area 29 at the outer periphery 13 and an inner cross-sectional area 30 at the inner end of each passage 23 and 24. The wall surfaces 25 and 26 are tapered toward each other so that the cross-sectional areas of the passages 23 and 24 decrease at a constant rate from the outer areas 29 to the inner areas 30 so that the inner cross-sectional area 30 is substantially smaller than the outer cross-sectional area 29.

The housing also includes a pair of semicylindrical inner walls 31 which partially encircle the rotors 11 except in the area of passageway 22, each semicylindrical inner wall 31 extending from the edge 27 of the wall surface 25 around each rotor 11 to the edge 28 of the opposite wall surface 26. The diameter of each semicylindrical inner wall 31 is slightly greater than the diameter of the partially encircled rotor 11 allowing the rotors 11 to rotate freely, thereby defining flow passageways or channels 32.

In the preferred embodiment of the present invention the width of the outer cross-sectional area 29 will be at least three times greater than the narrowest point between the drums 20 of the rotors 11, which define the passageway 22, and the radius of the drums 20 will be at least two times greater than the width of the impellers 21. Such relationship has been found to provide optimum efficiency.

The tapered passages 25 and 26 operate so that a flowing fluid entering the tapered passage 25 is directed into the passageway 22 formed between the drums 20 of rotors 11, as shown by the arrows A in FIG. 2. The flowing fluid passes through the passageway 22 striking the impellers 21 imparting contradirectional rotation to the rotors 11, as shown by the arrows B in FIG. 2. The flowing fluid is discharged in part through the second tapered passage 24, as shown by the arrows C in FIG. 2. However, a portion of the flowing fluid is diverted by the impeller 21 through the channels 32 surrounding each rotor 11. The diverted portions of the flowing fluid thus contribute to the contradirectional rotation of each of the rotors 11 and will reenter the passageway 22 with the incoming fluid flow.

The fluid flow driven engine 1 may be used to harness the energy of the tidal action of oceans or seas. In such an application, the first and second tapered passages 23 and 24 will alternatively serve as an inlet or an outlet for the flowing fluid depending on whether the tide is coming in or going out. In such an application, the rotors 11 will be capable of rotating in either direction and the reversible gears 15 and 16 will be shifted so as to drive the coupling 17 and the shaft 18 in the same direction irrespective of the direction of rotation of the rotors 11.

For the purposes of controlling the velocity of a fluid flowing through the passageway 22, extension plates 33 and 34 are slidably mounted on opposing wall surfaces 25 and 26, respectively, the extension plates 33, 34 being slidably mounted so as to be extendable beyond the inner edges 27 and 28 of the wall surfaces 25 and 26. As a pair of extension plates 32 and 34 are slidably advanced beyond the inner edges 27 and 28 of the walls 25 and 26, as shown in phantom lines in FIG. 2, the extension plates 33 and 34 redefine the length of the walls 25 and 26 and the width of the inner area 30, the walls 25 and 26 becoming effectively longer and the inner cross-sectional area 30 becoming smaller. By reducing the inner cross-sectional area 30, the velocity of a fluid entering the passageway 22 is increased. Thus, by varying the position of the extension plates 33 and 34 the velocity of the fluid entering the passageway 22 may be varied to effectively establish optimum operating conditions. Similarly, the extension plates 33 and 34 at the outlet side of passage way 22 may be adjusted to vary the width of the outlet area 30, thereby providing for additional regulation of the flowing fluid.

Figure 4:
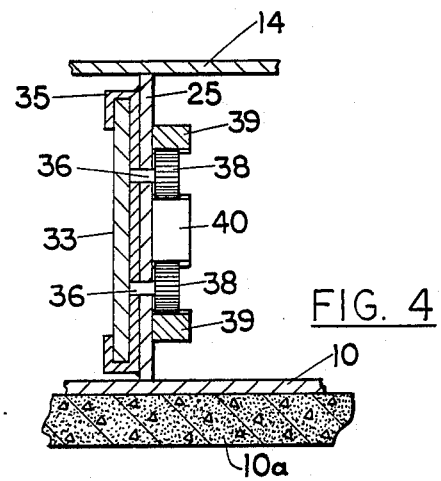
FIG. 4 is an enlarged fragmentary cross-sectional view taken along line 4—4 of FIG. 2 showing a mechanism for slidably advancing the rectangular plates.
Figure 5:
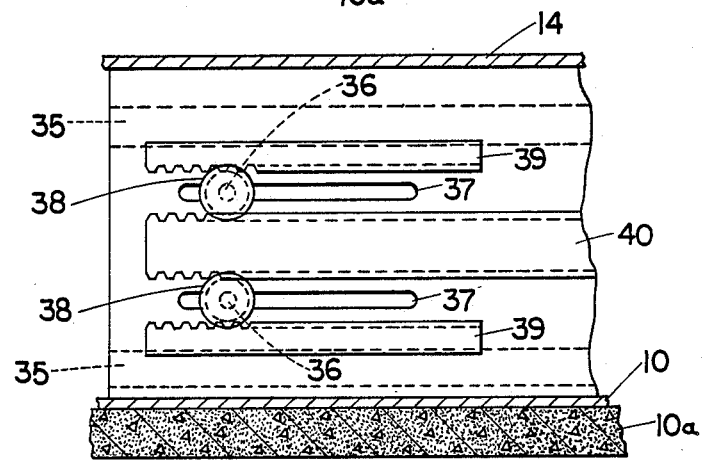
FIG. 5 is a fragmentary side elevational view of the mechanism shown in FIG. 4.

The means for slidably advancing the extension plates 33 and 34 may take different forms. FIGS. 4 and 5 illustrate an exemplary embodiment of a mechanism for slidably advancing the extension plates. Thus, the extension plate 33 is slidably mounted in a bracket 35 fixed to the wall surface 25, with a pair of vertically aligned posts 36 extending laterally from the extension plate 33 through pairs of slots 37 (seen in FIG. 5) which extend horizontally through both the bracket 35 and the wall 25.

A pinion gear 38 is rotatably secured to the end of each post 35, each of the pinion gears 38 engaging a stationary rack 39 fixed to the wall 25 and a slidable rack 40, the racks extending parallel to the slots 37. Advancement of the slidable rack 40 causes the extension plate 33 to correspondingly advance. The means for advancing the slidable rack 40 is not shown, but may comprise any conventional means, such as hydraulic pistons on other rack actuating mechanism.

Figure 6:
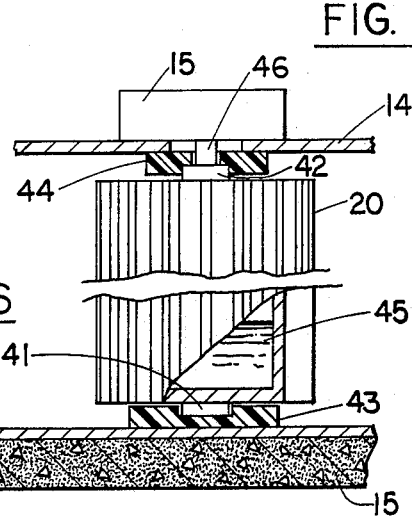
FIG. 6 is fragmentary vertical sectional view showing a preferred arrangement for mounting the rotors.

Referring now to FIG. 6, the drums 20 of the rotors are rotatably mounted within the housing by means of a lower axle 41 and an upper axle 42 which are received in annular bearings 43 and 44, respectively. Preferably, both the axles and the bearings will be formed from a lubric material, which may comprise a plastic material such as Nylatron G. S. In order to reduce friction and hence enhance rotation of the rotors, the drums 20 will be sealed and filled with sufficient ballast, such as water or sand, indicated at 45, so that the drums, when submerged in a flowing body of water, will be in an equilibrium condition, i.e.. the weight of the drums will be offset by their buoyancy when submerged, so that they will be effectively weightless. The upper bearing 44 will be provided with an extension 46 which is operatively connected to the overlying reversible gear unit, such as the gear unit 15.

Figure 7:
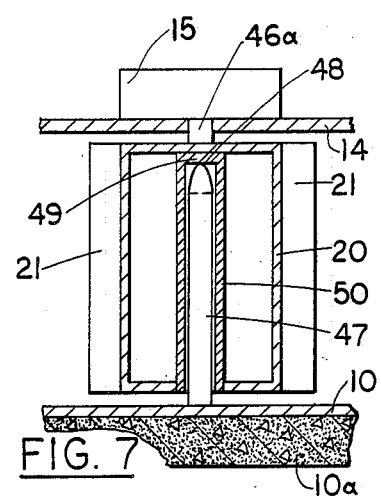
FIG. 7 is a fragmentary vertical sectional view similar to FIG. 6.

FIG. 7 illustrates an alternative construction for mounting the drums 20 for rotation with reduced friction. In this embodiment each drum 20 is rotatably mounted in a fixed bearing shaft 47 projecting upwardly from the base 10, the shaft terminating at its upper end in a rounded or tapered head 48 which is seated on a bearing pad 49, the shaft 47 being closely surrounded by a sleeve 50 which serves to stabilize the drum on the shaft 47, as well as to seal the interior of the drum so that it will be air tight. As in the case of the embodiment of FIG. 6, an extension 46a is provided to operatively connect the rotating drum to the overlying reversible gear unit 15.

As should now be apparent, the present invention provides a fluid flow driven engine which is of basically simple construction yet designed to achieve optimum operating efficiency under diverse operating conditions including operation in opposite directions depending on current flow and flow rate.

What is claimed is:

1. A reversible fluid flow driven engine comprising:
   (a) a base;
   (b) a pair of rotors rotably mounted on said base for selective rotation in opposite directions depending upon the direction of fluid flow, said rotors each comprising a cylindrical drum mounting a plurality of circumferentially spaced impellers projecting radially outward from said drum, said rotors being mounted in side-by-side spaced relation to define a fluid flow passageway between said drums;
   (c) a housing mounted on said base so as to surround said rotors, said housing having opposing outer peripheral walls terminating at their opposite ends in identical pairs of inwardly directed planar wall surfaces defining inwardly tapered passages communicating at their inner ends with the opposite ends of said passageway, said housing having an inner semi-cylindrical peripheral walls partially surrounding said rotors, said semi-cylindrical inner peripheral walls extending between the inner ends of the inwardly direction wall surfaces at one end of said opposing outer peripheral walls to the corresponding inner ends of the inwardly directed wall surfaces at the opposite end of said outer peripheral walls;
   (d) planar extension plates slidably mounted on said pairs of inwardly directed walls for movement in parallel relation thereto, said extension plates being displaceable inwardly beyond the innermost ends of said inwardly directed walls so as to vary the width of said passages at their innermost ends and thereby vary the velocity of a fluid flowing into said passageway;
   (e) actuating means for selectively extending said pairs of extension plates beyond the innermost ends of said inwardly directed walls;
   (f) reversible drive means for operatively connected said rotors to an energy generating system; and
   (g) said drums having a radius at least twice the width of said impellers, and the width of said passages at their outermost ends being at least three times greater than the smallest distance between said drums.

2. The fluid flow drive engine as claimed in claim 1 wherein said drums are air tight and are filled with ballast in an amount sufficient to maintain said drums in an equilibrium condition when submerged in a flowing body of water.

3. The fluid flow driven engine as claimed in claim 1 wherein the upper ends of said cylindrical drums are seated on the upper ends of vertical bearings shafts fixedly secured at their lower ends to said base, said bearing shafts being rounded at their upper ends and seated on bearing pads mounted at the upper ends of said drums, and additional stablizing bearing means on said drums surrounding said shafts intermediate their opposite ends.

* * * * *